United States Patent [19]

Major

[11] Patent Number: 4,741,374
[45] Date of Patent: May 3, 1988

[54] VEHICLE WHEEL
[75] Inventor: Douglas J. Major, Sutton Coldfield, United Kingdom
[73] Assignee: SP Tyres UK Limited, Fort Dunlop, England
[21] Appl. No.: 879,576
[22] Filed: Jun. 27, 1986
[30] Foreign Application Priority Data
Jun. 29, 1985 [GB] United Kingdom ............. 8516520
[51] Int. Cl.$^4$ .................................................. B60C 17/00
[52] U.S. Cl. .............................. 152/379.3; 152/375; 152/516
[58] Field of Search ............... 152/379.3, 379.4, 379.5, 152/381.3, 381.4, 516, 520, DIG. 17

[56]  References Cited
U.S. PATENT DOCUMENTS

| 3,777,797 | 12/1973 | Anderson . |  |
|---|---|---|---|
| 4,252,170 | 2/1981 | Watts | 152/520 |
| 4,260,006 | 4/1981 | Udall et al. | 152/379.3 X |
| 4,641,670 | 2/1987 | Poque et al. | 152/379.4 X |

FOREIGN PATENT DOCUMENTS 0019680  2/1980  Japan .................... 152/250

Primary Examiner—David A. Scherbel
Assistant Examiner—Russell D. Stormer
Attorney, Agent, or Firm—Birch, Stewart, Kolasch & Birch

[57]  ABSTRACT

A vehicle wheel adapted to provide support for deflated or punctured tire. The wheel rim comprises a pair of parallel, circumferentially extending, axially spaced-apart, radially outwardly facing bead seats. Adjacent to and axially outwards of each bead seat is a radially outwardly projecting tire retaining flange. A tire fitting well is provided between the bead seat and a substantially rigid, deflated tire support surface radially outwardly of the bead seats mounted upon a support member projecting radially from the well wherein the support member is positioned at one side of the well, considered in axial cross section of the wheel rim, around part of the circumference of the wheel rim and at the other side of the well around the remainder of the circumference so that tire fitting is facilitated. The support member is preferably at one side of the well around half the circumference and may also be integral and the remainder of the wheel rim.

6 Claims, 1 Drawing Sheet

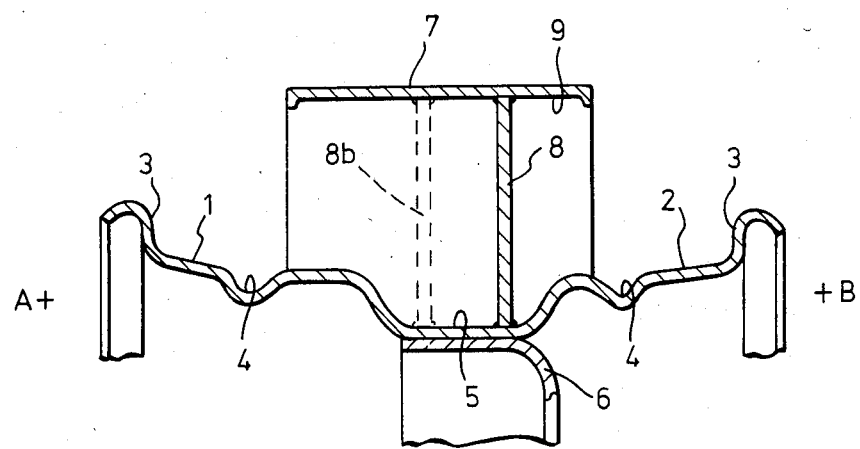

VEHICLE WHEEL

BACKGROUND AND SUMMARY OF THE INVENTION

The present invention relates to a vehicle wheel and in particular to a wheel which includes a rigid, circumferentially-extending support surface mounted on a radially extending member to provide a support surface for emergency deflated running of the tire.

A particular problem with wheels of this type particularly when the rim is of one piece tire, is to provide for assembly of a tire to the wheel and this becomes even more difficult with small sizes where the rim widths are limited.

The present invention has the object of providing for improved assembly.

According to one aspect of the present invention a wheel is provided which comprises a pair of parallel, circumferentially extending, axially spaced-apart, radially outwardly facing bead seats. Adjacent to and axially outwards of each bead seat is disposed a radially outwardly projecting tyre retaining flange. A tire fitting well is provided between the bead seats and a substantially rigid, deflated tire support surface radially outwardly of the bead seats mounted upon a support member projecting radially from the well whereby the support member is positioned at one side of the well, considered in axial cross section of the wheel rim, around part of the circumference of the wheel rim and at the other side of the well around the remainder of the circumference so that tire fitting is facilitated.

Preferably the support member is at one side of the well for half the circumference of the wheel rim. The support member may be separate to the wheel rim and detachably fastened thereto. More preferably, the support member is integral with the wheel rim so that a one piece wheel rim assembly is provided. This avoids assembly of an incomplete wheel with a tire.

The actual width of the well may be substantially less than the width of the two tire beads for which the wheel rim is designed because half the circumference of the well is availale for each of the beads.

Preferably bead retaining formations are provided adjacent to each bead seat immediately axially inwards of the bead seats. The retaining formations may be humps or a circumferentially extending groove formed in the wheel rim to provide a projecting toe on a tire designed for the wheel rim. Such tires are known in the industry as TD tires.

BRIEF DESCRIPTION OF THE DRAWINGS

Further aspects of the present invention will be apparent from the following description in conjunction with the attached drawing wherein the FIGURE is a cross-sectional view of one part of a wheel rim.

DETAILED DESCRIPTION OF THE INVENTION

The wheel rim comprises a pair of conventional circumferentially extending bead seats 1 and 2 each of which is tapered at an angle of 5° to the axial centerline of the wheel rim to provide seats for tire beads. The bead seats 1 and 2 each terminate in a radially outwardly directed tire retaining flange 3. Adjacent to bead seats 1 and 2 and axially inward thereof is a tire toe retaining groove 4. A tire fitting well 5 is provided between the bead regions of the wheel rim and a central wheel disk. This is welded to the underside of the well.

A circumferentially continuous support surface member 7 is provided radially outward of the bead seats and this provides a cylindrical surface to contact the inside of the tread of a tire if run deflated. The width of the support surface member 7 is approximately the distance between the pair of grooves 4.

The support surface member 7 is attached to the wheel rim by a radially extending steel web 8 which is welded to the radially inner surface 9 of the support surface member 7 and at its radial inner edge to the well 5. The steel web is not circumferentially continuous but comprises two sections of web, each of which extends around one half of the circumference of the wheel rim. One steel web is shown in full lines of the drawing and is positioned at the right hand side of the well close to the bead seat 2. The other steel web, which extends along the other half of the circumference is in the position 8b shown by a broken line in the drawing. Thus the construction provides a well which is accessible to one side only of the wheel rim for half the circumference but which is then accessible from the other side for the remainder of the circumference.

The height of the support surface member 7 measured radially from the wheel is substantially higher than the height of the flanges 3 but is sufficiently low to allow assembly of a tire to the wheel rim.

Tires assembly is carried out by positioning the wheel rim at 90° to a TD type tire, having toes shaped to fit the grooves 4, and thrusting the wheel rim into the tire. The tire beads take up an elliptical shape momentarily to allow the height of the support surface member 7 to enter into the interior of the tire cavity. The wheel is then turned to be co-axial with the tire so that a tire bead is at either side of the wheel rim at positions A and B.

Each tire bead in turn is then assembled to the wheel using the normal button-holing technique which is to position part of the bead in the well, choosing in this case the part which is adjacent to the half circumference of the well accessible from the side concerned and then lifting the remainder of the bead over its flange 3. Both beads are fitted to the rim in the same way but it will be appreciated that their rest positions are then both eccentric to the axis of the wheel rim. Inflation of the tire causes both bead seats to move axially outwards and take up their normal positions on their bead seats 1 and 2 with the tire retaining toes engaged in the grooves 4.

If run deflated, the tire is supported on the rigid support surface member 7 and the beads are retained by the bead retention means.

It is not essential that the steel web 8 is in two parts and a single steel web may be used which is bent to provide a cross over from one side of the well to the other and then again is bent to provide for the return. Alternatively a helically shaped web may be used.

Alternative bead retention formations may be used including humps adjacent to the bead seats 1 and 2. Alternatively the construction may be used without bead retention means although it is considered to have best value when used with bead retention.

The wheel rim may be assembled from steel components made by normal rolling and forming methods or may be a cast wheel rim in which case a support surface member may be cast integrally with the wheel rim.

A lubricant/cushioning layer may be used on the support surface member to contact the inside of the tire when running deflated.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

Having now described my invention what I claim is:

1. A wheel comprising
   a pair of parallel, circumferentially extending, axially spaced-apart, radially outwardly facing bead seats,
   a radially, outwardly projecting tire retaining flange disposed adjacent to and axially outwards of each bead seat,
   a tire fitting well extending between the bead seats in an axial direction and
   a substantially rigid, deflated-tire support surface extending radially, outwardly of the bead seats and mounted upon a support member projecting radially from the well, wherein the support member is positioned near one side of the well to extend around part of the circumference of the well, and is positioned near the other side of the well to extend around the remainder of the circumference of the well.

2. The wheel rim according to claim 1 wherein the support member is at one side of the well for one half of the circumference of the wheel rim.

3. The wheel rim according to claim 1 wherein the support member is integral with the wheel rim.

4. The wheel rim according to claim 1 wherein the axial width of the well is substantially less than the two tire beads for which the wheel rim is designed.

5. The wheel rim according to claim 1 wherein a tire bead retaining formation is provided adjacent each bead seat, immediately axially inward of said bead seat.

6. The wheel rim according to claim 5 wherein the retaining formation comprises a circumferentially extending groove formed in the wheel rim to receive a projecting toe on a tire designed for the rim.

* * * * *